F. GOFF.
RELIEF VALVE.
APPLICATION FILED DEC. 18, 1917.
1,305,598.
Patented June 3, 1919.
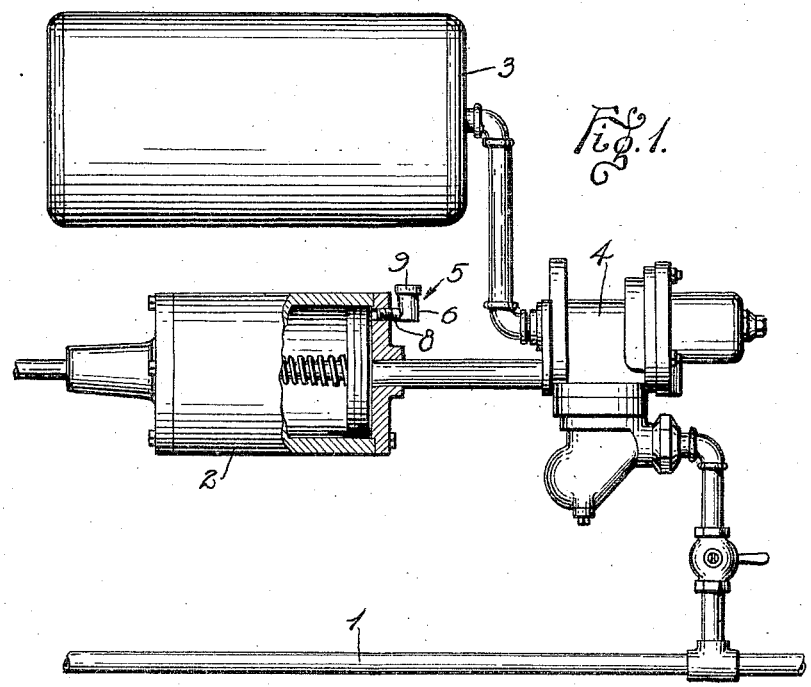
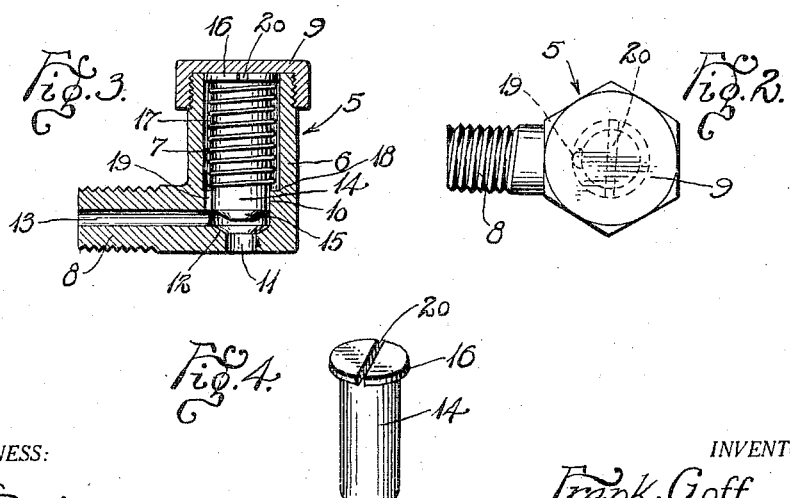
WITNESS:
E. V. Miller.
INVENTOR.
Frank Goff,
BY
Monroe F. Miller
ATTORNEY.

UNITED STATES PATENT OFFICE.

FRANK GOFF, OF COLLINGSWOOD, NEW JERSEY.

RELIEF-VALVE.

1,305,598.   Specification of Letters Patent.   Patented June 3, 1919.

Application filed December 18, 1917. Serial No. 207,656.

*To all whom it may concern:*

Be it known that I, FRANK GOFF, a citizen of the United States, residing at Collingswood, in the county of Camden and State of New Jersey, have invented new and useful Improvements in Relief-Valves, of which the following is a specification.

The present invention relates to valves, and is particularly an improvement of the relief valve disclosed in my copending application, Serial No. 194,234, filed October 1, 1917.

The present valve, like that disclosed in said application, is designed primarily to avoid undesired accumulation of pressure in the brake cylinder and creeping on of the brakes, due to an overcharged or leaky brake pipe, defective feed valve, brake valve being in lap position, or the like, it being the object of this invention to improve the construction of the valve, so as to render it less liable to be clogged, and to otherwise increase its efficiency.

The valve is operable to permit the pressure fluid which accidentally leaks into the brake cylinder, to escape to the atmosphere, instead of accumulating in the brake cylinder and applying the brakes, which if it occurs reduces the capacity of the locomotive, causes detention, increases the consumption of fuel, increases the wear and tear on the brake shoes, wheels and other equipment, and otherwise impairs the system.

The present valve is not only useful in air-brake apparatus, but can also be used to advantage on many other devices wherein it is desired to permit air, water or other fluid to escape under atmospheric or low pressure, and to cut off such escape of fluid when the pressure is increased above a predetermined amount.

With the foregoing and other objects in view, which will be apparent as the nature of the invention is better understood, the invention resides in the arrangement and construction of parts hereinafter described and claimed, it being understood that changes can be made within the scope of what is hereinafter claimed without departing from the spirit of the invention.

The invention is illustrated in the accompanying drawing, wherein—

Figure 1 is an elevation of a unit of the ordinary air brake equipment, showing the relief valve applied thereto.

Fig. 2 is an enlarged plan view of the relief valve.

Fig. 3 is median section thereof, portions being shown in elevation.

Fig. 4 is a perspective view of the valve member.

The air-brake equipment illustrated embodies the usual train or brake pipe 1, brake cylinder 2, reservoir 3, and triple valve 4 operable for the normal flow of pressure fluid from the brake cylinder to the atmosphere to release the brakes, and operable, in event of reduced pressure in the pipe 1, to establish the flow of pressure fluid from the reservoir 3 into the brake cylinder to apply the brakes.

The relief valve 5 is attached either directly or indirectly to the brake cylinder 2, and has the function of relieving pressure due to leakage into the cylinder for any cause whatever, and to retain the pressure when essential to apply the brakes.

The valve 5 embodies a suitable casing 6 having the bore or chamber 7 and an outstanding nipple 8 at one side near one end, which is threaded or otherwise attached to the brake cylinder or a pipe communicating therewith, thus enabling the valve to be quickly applied. A cap 9 is threaded or otherwise removably engaged over the opposite end of the casting 6 to close the mouth of the bore or recess 7, which terminates short of the end of the casing adjacent which the nipple 8 is located. Said bore or recess 7 has a reduced portion 10 adjacent to the last named end of the casing and the casing has a relief port 11 leading from the reduced portion 10 through said end of the casing concentric with the bore. The shoulder between the secondary bore or portion 10 and port 11 is beveled and provides a conical valve seat 12. The passage 13 of the nipple 8 leads to the reduced portion 10 of the bore or chamber 7 adjacent to the valve seat 12, and is of suitable cross section to restrict the flow of pressure fluid from the brake cylinder, while the port 11 is of larger diameter or cross section for two reasons, viz., it permits the motive fluid to escape through said port freely at a slower velocity than in the passage 13, and secondly, any foreign particles which enter the passage 13 and portion 10 can readily pass out through the port 11. The casing 6 is preferably arranged in an upright position in order that moisture, dirt and other foreign matter will readily drop out of the casing through the port 11.

The valve member 14 is of cylindrical form and one end portion works snugly in the reduced portion 10 of the bore 7, and is provided with a beveled or conical end 15 seatable snugly against the seat 12. The other end of the valve member 14 has a head or annular outstanding flange 16 working snugly in the main or enlarged portion of the bore 7, to guide said end of the valve, while the first named end is guided in the portion 10. The head 16 is seatable against the cap 9 to limit the movement of the valve member when opened by a coiled expansion spring 17 surrounding the valve member in the bore 7 and confined between the head 16 and shoulder 18 between said bore at its reduced portion 10. This spring is of suitable tension to normally unseat the valve member in the absence of pressure, and serves as a retarding or restraining means for preventing said valve from being closed below a predetermined pressure of the fluid flowing through the passage 13 and port 11 to the atmosphere. Therefore, any leakage of air into the brake cylinder can readily flow through the valve to the atmosphere, to avoid the accumulation of pressure and undesired application of the brakes, but should the triple valve operate, as usual, to admit air into the brake cylinder for applying the brakes, the increased pressure of the fluid flowing through the passage 13 and port 11 will immediately seat the valve member 14 and prevent further escape of fluid. In this connection, it is to be noted that the passage 13 being restricted readily permits a small flow of escaping fluid, due to leakage, without creating sufficient force to seat the valve member, but the moment that the flow is increased by the regular admission of fluid into the brake cylinder, the pressure of the escaping fluid becomes so augmented, that the valve member 14 is sucked with the fluid against its seat. The port 11 being of larger cross sectional area than the passage 13 permits the fluid to readily escape from the chamber of the casing 6, to avoid the accumulation of pressure between the valve member and its seat 12, which would of course be objectionable, but to the contrary, the flow of air from the passage 13 to the port 11 tends to suck the valve member with it.

It is preferable, although not necessary in some cases, to admit the pressure fluid behind the valve member, to facilitate the quick closing thereof. This is readily accomplished by providing a notch or channel 19 in the interior of the casing at one side of the portion 10 leading from the passage 13 to the shoulder 18. This channel enables the pressure fluid to flow into the bore or chamber 17 around the valve member, so as to equalize the pressure thereon, more or less. In this connection, it is desirable to provide the head 16 with a diametrical kerf or slot 20, to permit the pressure fluid to pass between the rear end of the valve member and cap 9 against which said member rests when opened by the spring 17. Said slot 20 extends to a depth completely through the head for the entrance of the fluid, and said slot is also of advantage in that it provides a kerf for a screwdriver or other implement to rotate the valve member, when the cap 9 is removed, for grinding the valve member and seat when pressed together and rotated.

From the foregoing, it will be readily understood that this valve will avoid the accumulation of pressure in the cylinder and consequent application of the brakes, due to leakage, but when there is a regular flow of air into the brake cylinder, the valve member will be seated instantly, due to suction at its forward end and pressure against its rear end, thereby overcoming the resistance of the spring 17. The valve is so constructed that it is not apt to stick or become clogged, and will not prevent the application of the brakes in the ordinary manner. The spring 17 of the valve is located out of the way, contrary to the retarding spring shown in said application, so as not to give any opportunity for clogging the valve. When the valve member is seated, it is readily so held by even the slightest pressure, but the moment the pressure is released from the brake cylinder, the spring 17 will again assert itself and instantly unseat the valve member.

Having thus described the invention, what is claimed as new is;

1. A relief valve having a relief port, a valve member normally removed from said port and movable toward said port to close it, and a passage of smaller cross section than said port leading to a point between said port and valve member.

2. A relief valve having a passage and a relief port of larger cross section, and a valve member normally withdrawn from between said passage and port, and movable therebetween and seatable toward said port.

3. A relief valve comprising a casing having a passage and a relief port of larger cross section, and a valve member movable in the casing normally withdrawn from between said passage and port, and movable therebetween and seatable toward said port.

4. A relief valve comprising a casing having a chamber with a reduced portion, a relief port leading from said reduced portion, a valve seat between said reduced portion and port, and a passage leading to said reduced portion, a valve member slidable in said reduced portion, and a spring in said chamber for unseating the valve member.

5. A relief valve comprising a casing having a chamber with a reduced portion and shoulder, a relief port leading from the reduced portion, a valve seat between said reduced portion and port, a passage leading to the reduced portion, and a channel extending from said passage to the shoulder, and a normally open valve slidable in said reduced portion.

6. A relief valve comprising a casing having a chamber with a reduced portion and shoulder, a relief port leading from the reduced portion, a valve seat between said port and reduced portion, a passage leading to the reduced portion, and a channel extending from said passage to the shoulder, a valve slidable in said reduced portion and having a head sliding in the chamber and provided with a kerf for the passage of fluid, and an expansion spring between said shoulder and head.

7. A relief valve comprising a casing having a chamber with a reduced portion and shoulder, a relief port leading from said reduced portion, a valve seat between the reduced portion and port, and a passage leading to said reduced portion, a cap closing said chamber, a valve member slidable in said reduced portion and having a head movable in the chamber, and an expansion spring between said head and shoulder.

8. A relief valve comprising a casing having a chamber with a reduced portion and shoulder, a relief port leading from said reduced portion, a valve seat between the reduced portion and port, and a passage leading to said reduced portion, a cap closing said chamber, a valve member slidable in said reduced portion and having a head movable in the chamber, and an expansion spring between said head and shoulder, the casing having a channel leading from said passage to the shoulder, and the head having a kerf for the passage of fluid.

9. A relief valve comprising a casing having a relief port, a guide, and a passage leading to the guide near said port, a valve member having a portion to seat in the casing over said port, said portion of the valve member being slidable in the guide, and means for normally moving the valve member away from said port and passage.

FRANK GOFF.

Witnesses:
DAVID S. RASH,
DOROTHY M. NORTH.

Copies of this patent may be obtained for five cents each, by addressing the "Commissioner of Patents, Washington, D. C."